No. 629,317. Patented July 18, 1899.
J. FIELDING.
APPARATUS FOR PRODUCING CARBURETED HYDROGEN.
(Application filed Sept. 6, 1898.)
(No Model.) 3 Sheets—Sheet 1.
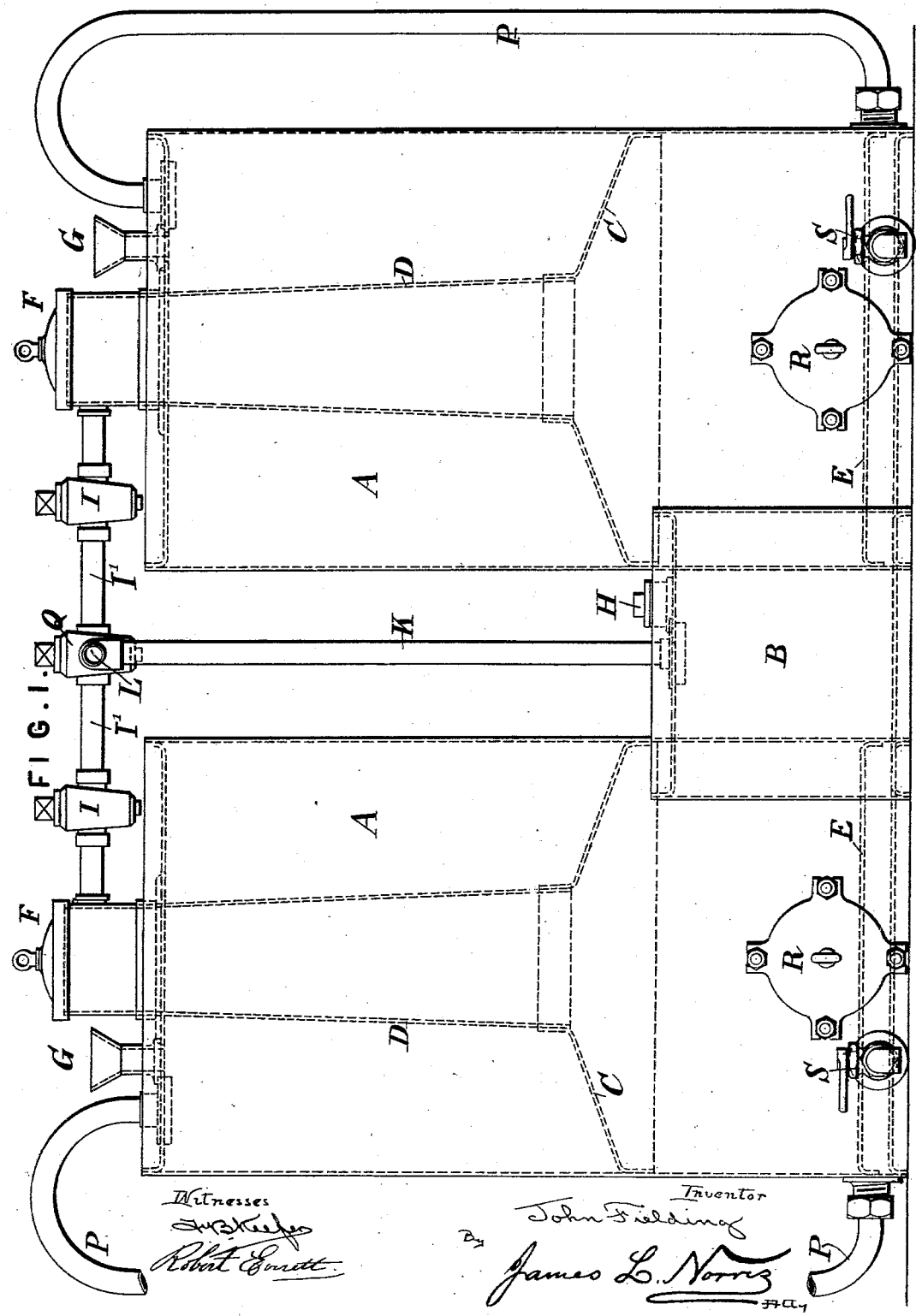

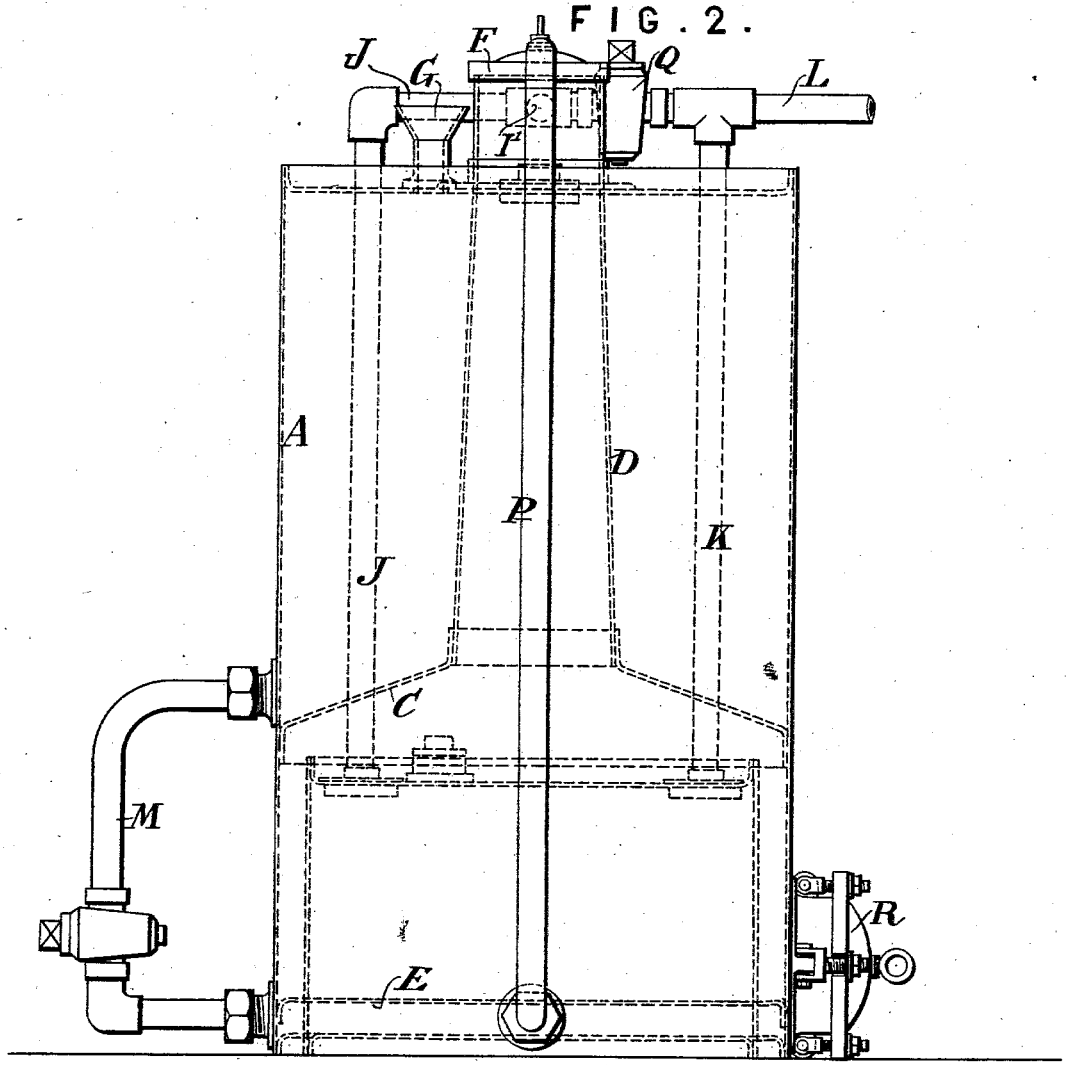

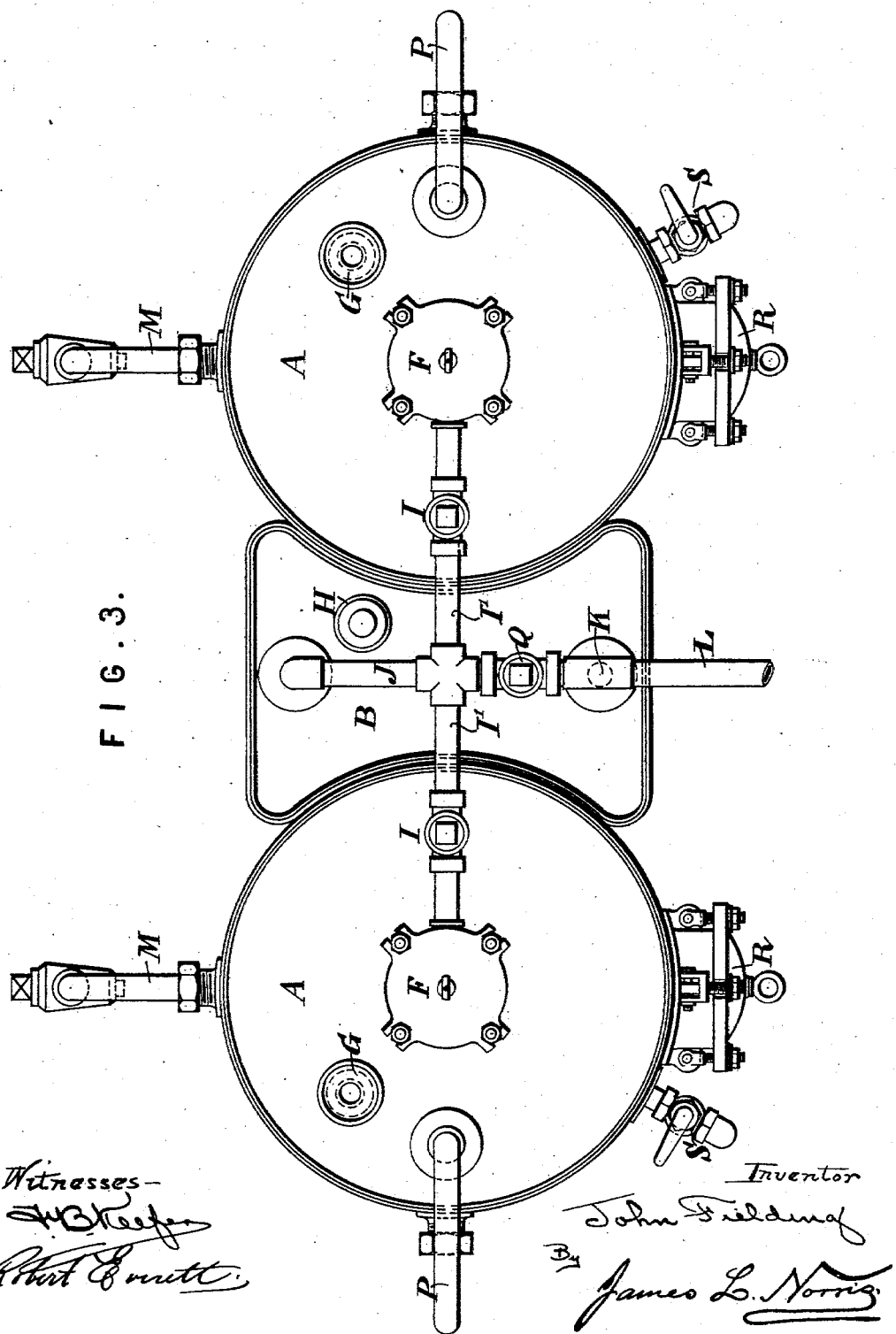

UNITED STATES PATENT OFFICE.

JOHN FIELDING, OF UPTON ST. LEONARDS, ENGLAND, ASSIGNOR TO THE GAS AND SULPHATE PRODUCER, LIMITED, OF LONDON, ENGLAND.

APPARATUS FOR PRODUCING CARBURETED HYDROGEN.

SPECIFICATION forming part of Letters Patent No. 629,317, dated July 18, 1899.

Application filed September 6, 1898. Serial No. 690,345. (No model.)

*To all whom it may concern:*

Be it known that I, JOHN FIELDING, engineer, a citizen of England, residing at Belmont, Upton St. Leonards, in the county of Gloucester, England, have invented certain new and useful Improvements in Apparatus for Producing and Carbureting Hydrogen, (for which I have applied for a patent in Great Britain, No. 17,516, dated August 13, 1898,) of which the following is a specification.

This invention relates to a simple and convenient apparatus for producing and carbureting hydrogen, which is preferably so arranged that the production can be continuously maintained, as will be described, referring to the accompanying drawings.

Figure 1 is a side elevation, Fig. 2 is an end elevation, and Fig. 3 is a plan, of apparatus according to my invention.

A A are two cylindrical producer vessels placed side by side at a little distance apart, and B is a carbureting vessel shaped to fit closely between the lower parts of the vessels A A. Within each of the vessels A there is a partition consisting of a part C, nearly horizontal, and a tapering tubular part D, extending up to and above the top of the vessel A. In the lower compartment of each vessel A is a perforated plate E of material which is not affected by the acid employed. On this perforated plate are laid fragments of zinc or of iron or steel, these being introduced through a manhole F at the top of tube D, which can be tightly closed. Each of the vessels A has at the top a funnel G, by which dilute acid, preferably sulfuric acid, can be introduced, and the carbureting vessel B has a hole with a screw plug or cover H for introducing benzoline or such like somewhat volatile oil.

From the upper ends of the vertical tubes D branch pipes I', provided with cocks I, lead to a pipe J, which extends down into the carbureting vessel B, while a pipe K ascends from that vessel to the service-pipe L, by which the carbureted gas is led away for use.

A pipe M, provided with cock, leads from the upper compartment of each vessel A to the lower. Another pipe P leads from the bottom of the lower compartment to the top of the upper compartment of each vessel A. Manholes R are provided by removing the residue of metal, and cocks S are provided for drawing off liquid.

The apparatus operates as follows: Either vessel A has its upper compartment charged with dilute acid and its lower compartment with the fragments of metal laid on the perforated plate. Also the carbureting vessel B is charged with the volatile oil. The dilute acid flowing in regulated quantity from the upper into the lower compartment through the pipe M and acting on the metal therein causes decomposition of the water, generating hydrogen, which ascends through D to the top of the vessel and passes by branch pipes I' and pipe J down to the carbureting vessel, taking up vapor and passing thence up through pipe K to the service-pipe L. By more or less opening a cock Q more or less of the gas may be allowed to pass direct to the service-pipe without passing through the carbureting vessel. While one of the generators is being charged or discharged, the other can go on generating without interrupting the supply of gas. Should at any time the gas-pressure exceed a certain amount, the dilute acid is forced up into the upper compartment through pipe P clear of the metal, so that the generation of gas ceases until the pressure becomes reduced. During the action of the acid on the metal heat is evolved, which aids in the vaporization of the oil in the carbureting vessel.

It will be obvious that when a continuous production of gas is not required a single producer A may be employed in combination with the carbureting apparatus B in the manner described.

When generators of large capacity are required, it is preferred to make the acid-chamber separate from those which contain the charges of iron. By this means one is able to employ vessels of much simpler form, such as wooden tanks lined with lead or other material not liable to be attacked by the acid.

Having thus described the nature of this invention and the best means I know of carrying the same into practical effect, I claim—

1. An apparatus for producing and carbureting hydrogen, consisting of two producer vessels having perforated plates in their bottom portions, partitions located, respectively, in the producer vessels and having vertical tubes rising to the tops of said vessels, a carbureter, branch pipes leading from the upper ends of said tubes, a pipe connection leading from the carbureter and common to said branch pipes, for conducting the generated hydrogen from both vertical tubes to said carbureter, a pipe leading from the latter to a service-pipe, and a pipe connection between the parts of each vessel which are above and below the partition therein, substantially as and for the purposes described.

2. An apparatus for producing and carbureting hydrogen, consisting of two producer vessels having perforated plates in their bottom portions, partitions located, respectively, in the producer vessels and having vertical tubes rising to the tops of said vessels, a carbureter located outside of the producer vessels, branch pipes leading, respectively, from the upper ends of the vertical tubes, a pipe connection common to both branch pipes and connected with the carbureter outside the producer vessels, for conducting the generated hydrogen from both vertical tubes to said carbureter, a pipe leading from the latter to a service-pipe, and a pipe connection between the parts of each producer vessel which are above and below the partition therein, substantially as described.

3. An apparatus for producing and carbureting hydrogen, consisting of two producer vessels having perforated plates in their bottom portions, partitions located in the producer vessels and having vertical tubes rising to the tops of said vessels, a carbureter located outside the producer vessels, valved branch pipes leading from the upper ends of said tubes and connected with the carbureter outside the producer vessels, for conducting the generated hydrogen from both of said vertical tubes to said carbureter, a pipe leading from the latter to a service-pipe, a pipe connection between the parts of each vessel which are above and below the partition therein, and pipes leading from the top portions of the producer vessels to the base portions thereof below the perforated plates therein, to convey dilute acid from the lower to the upper parts of the vessels when the gas-pressure exceeds a certain amount, substantially as described.

In testimony whereof I have hereunto set my hand in presence of two subscribing witnesses.

JOHN FIELDING.

Witnesses:
J. G. JONES,
W. J. H. PALIN.